No. 94,341. J. J. RIDGE. PATENTED AUG. 31, 1869.
PROCESS OF AND APPARATUS FOR TREATING FLOUR, MEAL, AND OTHER FARINACEOUS SUBSTANCES.
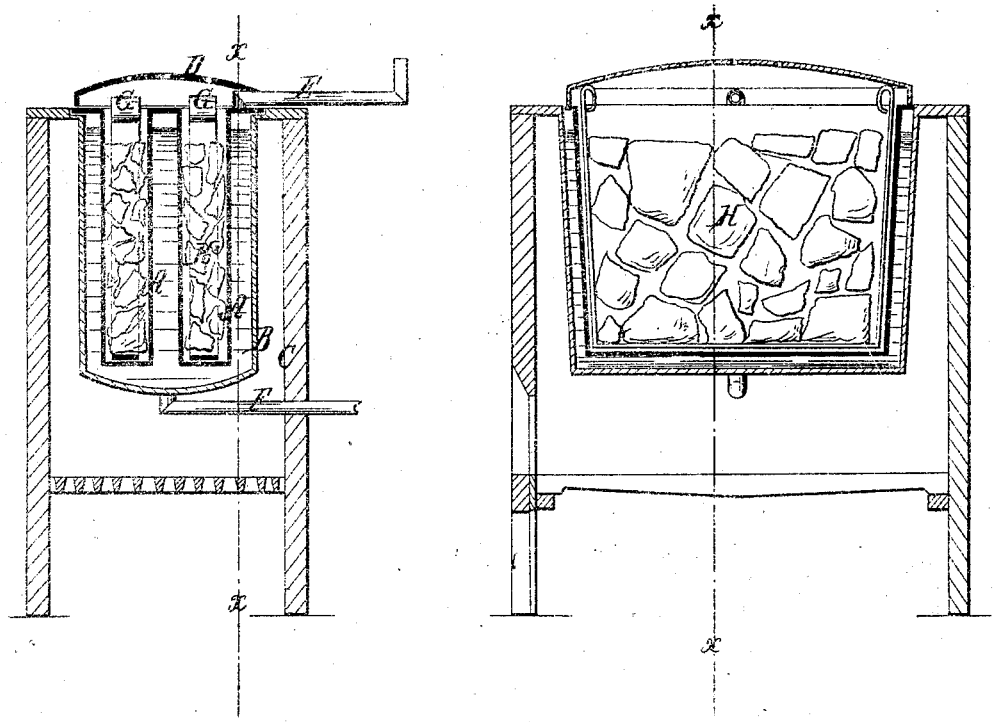

UNITED STATES PATENT OFFICE.

JOHN JAMES RIDGE, OF ST. JOHNS, SOUTHWARK, ENGLAND.

IMPROVED PROCESS AND APPARATUS FOR TREATING FLOUR, MEAL, AND OTHER FARINACEOUS SUBSTANCES.

*Specification forming part of Letters Patent No. 94,341, dated August 31, 1869.*

*To all whom it may concern:*

Be it known that I, JOHN JAMES RIDGE, of St. Johns, Southwark, county of Surrey, England, have invented a new and useful Improvement in Treating Farinaceous Substances; and I do hereby declare that the following is a full, clear, and exact description thereof, which will enable those skilled in the art to make and use the same, reference being had to the accompanying drawing, forming part of this specification.

My invention has reference to an improved process for treating and imparting medicinal properties to wheaten flour, Indian corn, rice, or like farinaceous substances, and obtaining therefrom a purer and more nutritious food than at present, applicable to infants and invalids.

The invention consists in subjecting the said farinaceous substances to a roasting or drying process while contained within closed vessels or chambers, surrounded by and maintained under heat uniformly for about six hours, to the temperature of boiling water, the heat being supplied by steam or otherwise, suitable outlet-pipes or passages in the apparatus being provided for the escape of the vapor or gases evolved during the process. The ingredients thus prepared are to be mixed or incorporated with other matters of an alkaline or saccharine nature, in such proportions as may be found necessary for allaying acidity or otherwise rendering the same soothing or agreeable to the palate.

The invention also comprises an improved apparatus for treating the said substances.

Figure 1 represents a transverse section of the said improved apparatus, taken on the line *x x* of Fig. 2. Fig. 2 represents a longitudinal section taken on the line *y y* of Fig. 1.

Similar letters of reference indicate corresponding parts.

A A is a vessel for containing the said farinaceous substances, and B a vessel surrounding it, containing water or steam. C represents a furnace, under and surrounding the vessel B at the sides, for producing heat. D is a perforated cover for the vessel A, to permit the escape of the gases from the substances under treatment. E is a pipe for the escape of the steam, and F a pipe leading from the bottom of the vessel B, which may be used for drawing off the water, or for supplying steam, when the heating is to be done by steam.

I may also use vessels having other arrangements or details of construction, and I do not desire to limit myself to the arrangement here shown. G represents metallic plates, traversing the bottom of A, and rising at the ends, for raising out the cooked matters. H represents the farinaceous substances under treatment.

The process by which I obtain my new food is as follows: The purest and finest description of wheaten or other flour is placed in the inner vessel A, as shown in the drawing, and surrounded by boiling water, steam, or otherwise, through the medium of the outer vessel, and thus kept or maintained under heat, uniformly from six to eight hours, until the farina presents a definite taste and appearance, and has become thoroughly cooked or dressed. The food is then to be rolled, sifted, and pounded until a perfect state of smoothness and softness has been obtained after which bicarbonate of soda in the proportion of two drams to a pound of the cooked flour, to which also half an ounce of powdered lump-sugar is to be added, and thoroughly incorporated therewith, when the whole is ready for use.

Oat, Indian corn, rice, or other farinaceous flour or meal may be employed and treated in like manner, and the apparatus may be used singly or in sets, and heated by gas, fire, or otherwise, as found best.

Having thus described my invention, what I claim as new, and desire to secure by Letters Patent, is—

1. The herein-described improved process for the treatment and preparation of farinaceous substances, substantially as specified.

2. The combination of the vessel A, having a perforated top, the vessel B, provided with the pipes E and F, and arranged for treating either by fire, gas, or steam, and the plates G, substantially as specified.

JOHN JAMES RIDGE, M. D.

Witnesses:
G. F. WARREN,
T. L. WARNER,
*Both of No. 17 Gracechurch Street, London.*